United States Patent Office 3,268,124
Patented August 23, 1966

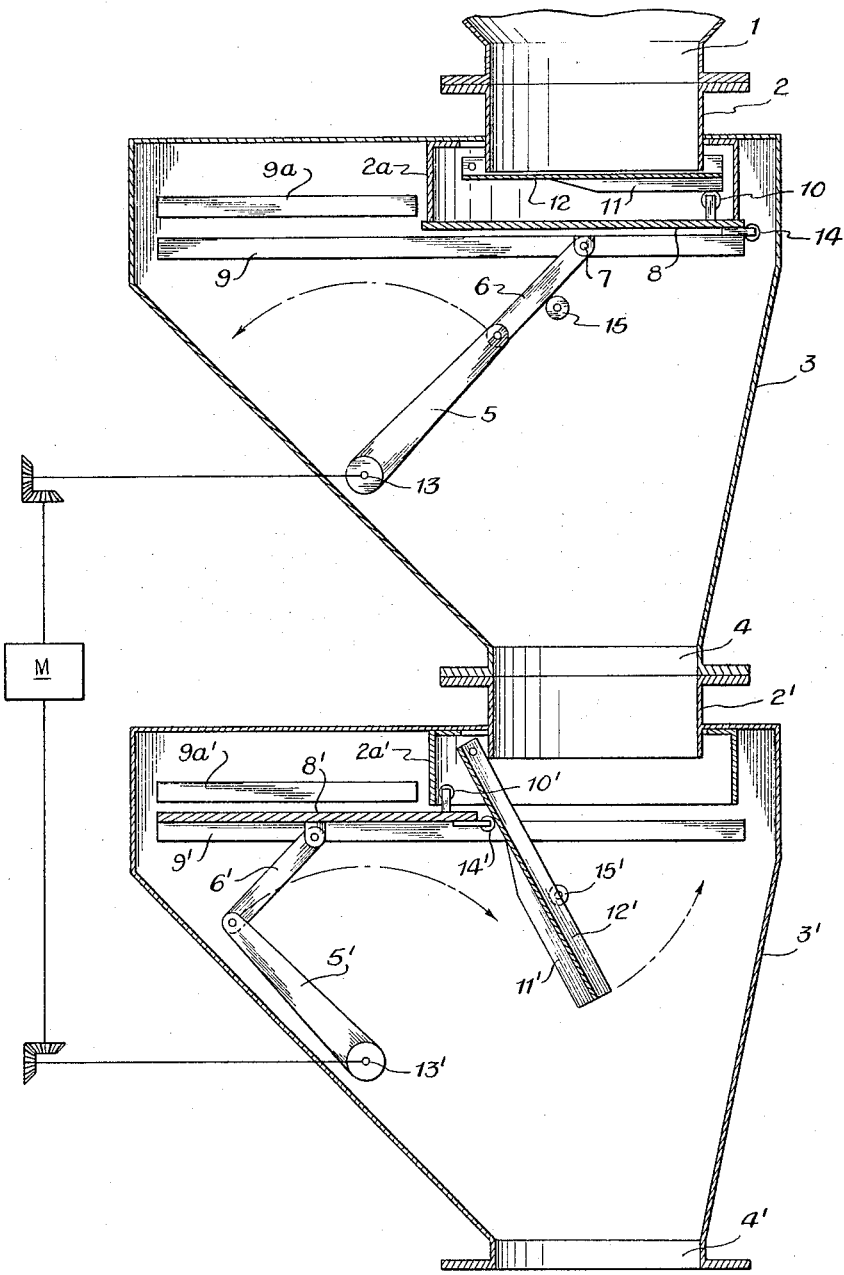

3,268,124
APPARATUS FOR DUMPING DUST AND/OR GRANULAR MATERIAL FROM COLLECTING HOPPERS
Joachim Weber, Kronberg, Taunus, Germany, assignor to Metallgesellschaft Aktiengesellschaft, Frankfurt am Main, Germany
Filed Mar. 31, 1965, Ser. No. 444,234
Claims priority, application Germany, Apr. 4, 1964, M 60,539
6 Claims. (Cl. 222—445)

This invention relates to an apparatus for dumping dust and/or granular material from collecting hoppers and, in particular, to a trap door closure for such hoppers.

Hoppers are used to collect dust or granular materials coming from a dust separating apparatus operating under a less than atmospheric pressure and/or a high temperature, as, for example, an electrostatic gas filter. Such hoppers have been provided with double-door outlets functioning as gas-proof locks against the entrance of outside air into the filter and to prevent the filter from losing heat.

Such outlets include a system of pendulum-like trap doors which close the hopper opening in a horizontal plane and automatically open only when the weight of the dust or granular material on the doors is greater than the counterweights on the doors. Such doors have the disadvantage in that they are directly contacted by the material leaving the hopper and are thus subject to wear and abrasion. Eventually the wear is such that it cannot be assured that the pressure and temperature in the filter can be maintained substantially constant.

The object of this invention is to produce a hopper discharge opening closure means which assures a tight seal against the loss of temperature and the entrance of outside air into the hopper and filter.

According to this invention, the dust or granular material discharge opening from a collecting hopper in an apparatus operating at less than atmospheric pressure and/or high temperatures is opened and closed by a trap door and a slide door plate. An uppermost collecting hopper connected directly to the filter discharges into an intermediate hopper and from there into a similar lowermost hopper. Each trap door and slide door plate forms an enclosure which is tightly closed by pressing the slide door plate against a wall surrounding the trap and slide plate doors.

Another feature of this invention is in that the slide door plates are movably mounted on guide rails and are driven by jointed arms. A further feature of the invention is in that the slide door plates are provided with rollers mounted at right angles to each other for first lifting the trap door and then pressing the trap door against the outlet opening of the overhead hopper.

The closure means of this invention is usable in less than atmospheric pressures and under high temperatures. It has the advantage over heretofore used closures in that it is subject to less wear and tear because the slide door plates are never contacted by the falling dust or granular material to be discharged, and the sealing edges are not contacted by any abrasive matter. In this invention, the discharge openings of adjacent hoppers are alternately opened and closed so that two hopper discharge openings are never open at the same time.

The means by which the objects of the invention are obtained are described more fully with reference to the accompanying drawing which shows a vertical cross-sectional view through the dust collecting hoppers and discharge opening closures of this invention.

The bottom discharge opening only of an uppermost hopper 1 is shown in the drawing. This opening is formed by a pipe 2 which extends slightly into an intermediate hopper 3. In turn, the discharge outlet opening 4 of hopper 3 is formed by a pipe 2' which extends into a similar hopper 3' having a material discharge opening 4'. The closure means for the pipes 2 and 2' is similar. As shown in hopper 3, the outlet end portion of pipe 2 is surrounded by a wall 2a in order to form an enclosure beneath pipe 2. Jointed arms 5 and 6 are pivotally connected to a bracket 7 fastened to a slide door plate 8 which is movably slidable between guide rails 9 and 9a mounted in the hopper. A roller 10 mounted on the upper surface of plate 8 engages a cam 11 secured to a trap door 12, which trap door closes the outlet opening of pipe 2. Plate 8 is pressed firmly against the lower edge of wall 2a and forms an enclosure therewith beneath trap door 12. To open this closure, arms 5 and 6 are first rotated counterclockwise so that plate 8 first drops slightly and then moves between rails 9 and 9a to the left. These rails are spaced from each other a distance greater than the thickness of plate 8 so that the plate can be raised from rail 9 when the plate is in closed position. At the same time, roller 10 riding on cam 11 permits trap door 12 to fall under the weight of the material in hopper 1 so that trap door 12 is not opened until plate 8 has reached its fully opened position to the left and is out of the way of any material falling through pipe 2. Therefore, the highly polished sealing surface of plate 8 and the lower edge of wall 2a are not contacted by the falling material and are thus not subject to wear. Arms 5 and 6 are driven by a motor M connected to a shaft 13, as schematically shown. A second roller 14 is mounted on the end of plate 8 at a right angle to the roller 10. An arm stop roller 15 is secured to hopper 3.

In hopper 3', a closure similar to that in hopper 3 is shown in fully opened position and with its closing movement indicated.

In closing, the arms 5' and 6' are driven clockwise so that plate 8' is slid to the right on guide rail 9'. A roller 14' joined to the leading edge of plate 8' first engages the cam 11' to lift trap door 12' until the cam is engaged by the roller 10' to raise the trap door to horizontal position against the lower edge of pipe 2'. Thus, at this time, it is impossible for any dust or granular material to fall out of hopper 3' onto the sealing surface of plate 8' and the lower edge of wall 2a'. Additional movement to the right of plate 8' takes place until arm 6' contacts a roller stop 15' which causes arm 6' to pivot toward a vertical position with respect to arm 5' and, in so doing, raises plate 8' up against the lower edge of wall 2a' to effect a tight gas and dust seal. In this lifting movement, the plate 8' is raised from lower guide rail 9'.

In this apparatus, the trap doors 12 and 12' merely function to keep the material in the hopper from falling downwardly. Therefore, they do not have to be finished so as to make an absolutely tight closure for the bottom edges of pipes 2 and 2', respectively.

Although the hoppers 3 and 3' are shown to be vertically aligned, they can be effectively arranged in stepped relation to each other.

Having now described the means by which the objects of the invention are obtained,

I claim:

1. Dumping means for a dust or granular material collecting uppermost hopper exposed to less than atmospheric pressures and/or high temperatures comprising a pipe secured to the bottom of said uppermost hopper and forming a discharge opening in said bottom, said pipe having a lower edge, an intermediate hopper beneath said uppermost hopper and surrounding the lower edge portion of said pipe, a trap door mounted in said intermediate hopper for opening and closing said discharge opening, wall means surrounding said trap door for providing an enclosure beneath said trap door when closed, and slide door plate means movably mounted beneath said frame means for engaging and closing an opened trap door and for bearing against said wall means to form a tight seal for the enclosure; and a lowermost hopper similar to said intermediate hopper positioned below said intermediate hopper.

2. Dumping means as in claim 1, said slide door plate means comprising a slide plate, guideway means for said slide plate, and power driven jointed arm means for moving said slide plate on said guideway means to open and close the trap door.

3. Dumping means as in claim 2, said slide door plate means further comprising roller means on said slide plate for engaging said trap door to first lift and then close the trap door against the lower edge of the pipe.

4. Dumping means as in claim 3, further comprising means for closing the slide door plate means in said lowermost hopper when opening the slide door plate means in the intermediate hopper, and vice versa.

5. Dumping means as in claim 3, further comprising a cam on the trap door engageable by said roller means.

6. Dumping means as in claim 3, further comprising stop means for engagement with said arm means to tightly close said trap door.

References Cited by the Examiner

UNITED STATES PATENTS

| | | | |
|---|---|---|---|
| 2,626,066 | 1/1953 | Rasmussen | 222—445 X |
| 2,732,107 | 1/1956 | Ridley | 222—450 X |

FOREIGN PATENTS

| | | |
|---|---|---|
| 23,892 | 11/1902 | Great Britain. |

ROBERT B. REEVES, *Primary Examiner.*

HADD S. LANE, *Examiner.*